US012314395B2

(12) United States Patent
Liu et al.

(10) Patent No.: US 12,314,395 B2
(45) Date of Patent: May 27, 2025

(54) TRAINING DATA PROTECTION FOR ARTIFICIAL INTELLIGENCE MODEL IN PARTITIONED EXECUTION ENVIRONMENT

(71) Applicant: EMC IP Holding Company LLC, Hopkinton, MA (US)

(72) Inventors: Jinpeng Liu, Shanghai (CN); Michael Estrin, Austin, TX (US); Zhen Jia, Shanghai (CN); Kenneth Durazzo, Morgan Hill, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 32 days.

(21) Appl. No.: 17/362,107

(22) Filed: Jun. 29, 2021

(65) Prior Publication Data

US 2022/0414223 A1   Dec. 29, 2022

(51) Int. Cl.
*G06F 21/57*     (2013.01)
*G06F 21/53*     (2013.01)
(Continued)

(52) U.S. Cl.
CPC .............. *G06F 21/57* (2013.01); *G06F 21/53* (2013.01); *G06F 21/602* (2013.01); *G06F 21/606* (2013.01); *G06N 3/02* (2013.01)

(58) Field of Classification Search
CPC .......... G06F 21/53; G06F 21/57; G06F 9/546; G06F 21/602; G06F 21/606; G06N 3/02
See application file for complete search history.

(56) References Cited

U.S. PATENT DOCUMENTS 10,643,144 B2   5/2020  Bowers et al.
2014/0118355 A1  5/2014  Vassilvitskii et al.
(Continued)

FOREIGN PATENT DOCUMENTS

WO   WO-2020190776 A1 *  9/2020  ............. G06F 12/14

OTHER PUBLICATIONS

T. Elgamal and K. Nahrstedt, "Serdab: An IoT Framework for Partitioning Neural Networks Computation across Multiple Enclaves," 2020 20th IEEE/ACM International Symposium on Cluster, Cloud and Internet Computing (CCGRID), May 11, 2020, pp. 519-528 (Year: 2020).*
(Continued)

*Primary Examiner* — Michael R Vaughan
*Assistant Examiner* — Ethan V Vo
(74) *Attorney, Agent, or Firm* — Ryan, Mason & Lewis, LLP

(57) ABSTRACT

Techniques for training data protection in an artificial intelligence model execution environment are disclosed. For example, a method comprises executing a first partition of an artificial intelligence model within a secure execution area of an information processing system and a second partition of the artificial intelligence model within a non-secure execution area of the information processing system, wherein data at least one of obtained and processed in the first partition of the artificial intelligence model is inaccessible to the second partition of the artificial intelligence model. Communication between the first partition and the second partition may be enabled via a model parallelism-based procedure. Data obtained in the secure execution area may comprise one or more data samples in an encrypted form usable to train the artificial intelligence model.

20 Claims, 4 Drawing Sheets

(51) Int. Cl.
   *G06F 21/60*   (2013.01)
   *G06N 3/02*    (2006.01)

(56) References Cited

U.S. PATENT DOCUMENTS

| | | | |
|---|---|---|---|
| 2018/0136912 A1 | 5/2018 | Venkataramani et al. | |
| 2019/0042878 A1* | 2/2019 | Sheller | G06K 9/6269 |
| 2019/0286657 A1 | 9/2019 | Li et al. | |
| 2019/0296910 A1* | 9/2019 | Cheung | G06F 7/588 |
| 2019/0318240 A1* | 10/2019 | Kulkarni | G06N 3/063 |
| 2019/0392305 A1* | 12/2019 | Gu | G06N 3/08 |
| 2020/0082270 A1* | 3/2020 | Gu | G06N 3/045 |
| 2020/0082279 A1* | 3/2020 | Arora | G06N 3/08 |
| 2020/0257992 A1 | 8/2020 | Achin et al. | |
| 2020/0273558 A1* | 8/2020 | Yousfi | H04L 63/126 |
| 2020/0327371 A1 | 10/2020 | Sharma et al. | |
| 2020/0334544 A1 | 10/2020 | Liu et al. | |
| 2020/0387776 A1* | 12/2020 | Farhadi | G06N 3/082 |
| 2020/0401930 A1 | 12/2020 | Smirnov et al. | |
| 2021/0034582 A1 | 2/2021 | Liu et al. | |
| 2021/0112038 A1* | 4/2021 | Karame | G06N 3/08 |
| 2021/0150411 A1* | 5/2021 | Coenders | G06F 21/53 |
| 2021/0192360 A1* | 6/2021 | Bitauld | G06N 3/084 |
| 2022/0114014 A1* | 4/2022 | Chen | G06F 9/5066 |
| 2022/0197994 A1* | 6/2022 | Sternby | G06N 3/084 |
| 2023/0198759 A1* | 6/2023 | Shim | G06F 12/145 713/193 |

OTHER PUBLICATIONS

Stack Overflow, "Why should weights of Neural Networks be initialized to random numbers?", Nov. 20, 2018, Retrieved from The Wayback Machine (Year: 2018).*

Tramer F, Boneh D. Slalom: Fast, verifiable and private execution of neural networks in trusted hardware. arXiv preprint arXiv:1806. 03287. Jun. 8, 2018. (Year: 2018).*

D. Stutz, "Implementing Tensorflow Operations in C++—Including Gradients," https://davidstutz.de/implementing-tensorflow-operations-in-c-including-gradients/, Feb. 4, 2017, 14 pages.

Github, Inc. "Create an op," https://github.com/tensorflow/docs/blob/master/site/en/guide/create_op.md, Jul. 16, 2020, 30 pages.

Microsoft, "Microsoft SEAL," https://www.microsoft.com/en-us/research/project/microsoft-seal/, 2021, 4 pages.

Fate, "An Industrial Grade Federated Learning Framework," https://fate.fedai.org/, 2021, 5 pages.

Github, Inc. "Deep Learning with Intel SGX," https://github.com/landoxy/intel-sgx-deep-learning, Jan. 21, 2019, 4 pages.

Github, Inc. "Tensorflow/mesh," https://github.com/tensorflow/mesh, Accessed Apr. 15, 2021, 13 pages.

L. Song et al., "HyPar: Towards Hybrid Parallelism for Deep Learning Accelerator Array," arXiv:1901.02067v1, Jan. 7, 2019, 13 pages.

Wikipedia, "Intermediate Representation," https://en.wikipedia.org/w/index.phptitle=Intermediate_representation&oldid=905361000, Jul. 8, 2019, 3 pages.

Z. Jia et al., "Beyond Data and Model Parallelism for Deep Neural Networks," Proceedings of the 2nd SysML Conference, 2019, 13 pages.

Wikipedia, "Trusted Execution Environment," https://en.wikipedia.org/w/index.php?title=Trusted_execution_environment&oldid=1027841774, Jun. 10, 2021, 7 pages.

Wikipedia, "Software Guard Extensions," https://en.wikipedia.org/w/index.php?title=Software_Guard_Extensions&oldid=1028673056, Jun. 15, 2021, 5 pages.

Intel Corporation, "Intel® SGX SDK Developer Reference for Windows," Mar. 10, 2020, 461 pages.

AMD, "AMD SEV-SNP: Strengthening VM Isolation with Integrity Protection and More," White Paper, Jan. 2020, 20 pages.

Arm Limited, "TrustZone for Cortex-A," https://developer.arm.com/ip-products/security-ip/trustzone/trustzone-for-cortex-a, Accessed Jun. 29, 2021, 9 pages.

Arm Limited, "TrustZone for Cortex-M," https://developer.arm.com/ip-products/security-ip/trustzone/trustzone-for-cortex-m, Accessed Jun. 29, 2021, 18 pages.

U.S. Appl. No. 17/352,653 filed in the name of Jinpeng Liu et al. filed Jun. 21, 2021, and entitled "Training Data Protection in Artificial Intelligence Model Execution Environment."

* cited by examiner

100

200

TRAINING DATA PROTECTION FOR ARTIFICIAL INTELLIGENCE MODEL IN PARTITIONED EXECUTION ENVIRONMENT

FIELD

The field relates generally to information processing systems, and more particularly to artificial intelligence (AI) model management implemented in an information processing system.

BACKGROUND

When training an AI model, such as a deep learning model, as part of a given application program, it is beneficial to have real-world input data samples in the training data directly related to the application subject matter, e.g., financial information about a customer in a bank credit card application, medical data in an insurance application, or roadmap data from a foreign country in an auto-driving system. Typically though, such data contains sensitive information of the customer or a local jurisdiction and cannot be exposed due to privacy concerns and/or sanctioning policies. Therefore, training data samples often times need to be protected from direct access by application service providers (e.g., the auto-driving system operators) and/or third-parties.

SUMMARY

Embodiments provide techniques for training data protection for an artificial intelligence model in a partitioned execution environment.

According to one illustrative embodiment, a method comprises executing a first partition of an artificial intelligence model within a secure execution area of an information processing system and a second partition of the artificial intelligence model within a non-secure execution area of the information processing system, wherein data at least one of obtained and processed in the first partition of the artificial intelligence model is inaccessible to the second partition of the artificial intelligence model.

Advantageously, in one or more illustrative embodiments, data obtained in the secure execution area may comprise one or more data samples in an encrypted form usable to train the artificial intelligence model, as well as at least one cryptographic key useable to convert the one or more data samples into a decrypted form within the secure execution area. Further, in one or more illustrative embodiments, communication between the first partition and the second partition is enabled via a model parallelism-based procedure. Still further, in some illustrative embodiments, the secure execution area comprises a secure virtual machine and the non-secure execution area comprises a non-secure virtual machine.

These and other features and advantages of embodiments described herein will become more apparent from the accompanying drawings and the following detailed description.

DETAILED DESCRIPTION

Figure 1:
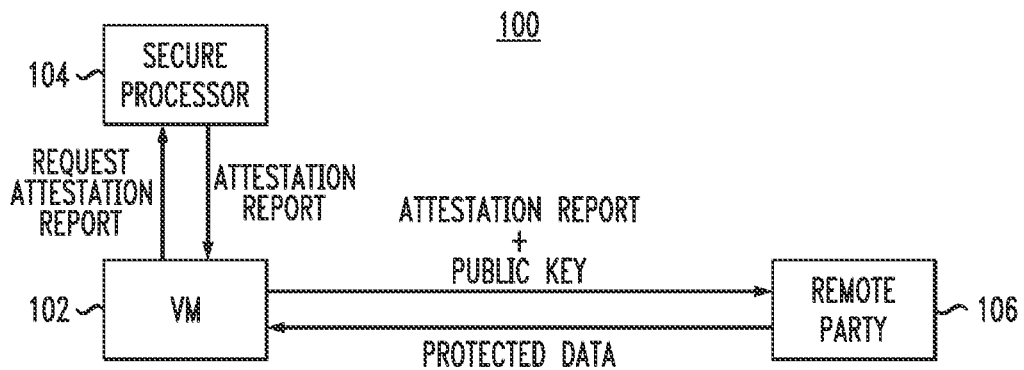
FIG. 1 illustrates a partitioned execution environment with which one or more illustrative embodiments can be implemented.

Illustrative embodiments will now be described herein in detail with reference to the accompanying drawings. Although the drawings and accompanying descriptions illustrate some embodiments, it is to be appreciated that alternative embodiments are not to be construed as limited by the embodiments illustrated herein. Furthermore, as used herein, the term "includes" and its variants are to be read as open-ended terms that mean "includes, but is not limited to." The term "based on" is to be read as "based at least in part on." The term "an embodiment" and "the embodiment" are to be read as "at least one example embodiment." Other definitions, either explicit or implicit, may be included below.

It is realized that data is one of the most important assets of a company and, in many cases, constitutes the true business value of a company. With the rise of the so-called data economy, companies find enormous value in collecting, sharing, and using data. However, transparency in how businesses request consent, abide by their privacy policies, and manage the data that they have collected is vital to building trust and accountability with customers and partners who expect privacy.

Furthermore, some countries and organizations have regulations that data representing certain information specific to a particular jurisdiction or geographic area, e.g., native gene structures or local roadmap data, cannot be collected and accessed directly by foreign companies. Such regulations may greatly restrict prediction precision if a remote diagnosis or an auto-driving system is intended to provide service to local customers but without training an AI model with the local gene or roadmap data.

Assume, for example, that a company based in country A wants to develop an auto-driving system with the intent to operate the auto-driving system in markets of county B and to train the system using local roadmap data of country B. However, further assume that security regulation policies of country B restrict collection and/or access of local roadmap data outside country B, and thus company A cannot collect or directly access the roadmap information itself. So company A finds a local company in country B to serve as an intermediary between itself and a governmental agency of country B, and thus to collect the roadmap information. The problem now is that company A needs a solution to assure the governmental agency that it cannot directly access the local roadmap information and, at the same time, use this roadmap information to train its auto-driving system.

In order to attempt to protect data samples for training an AI model, such as a deep learning model based on an artificial full connection neural network, from being directly accessed by application service providers (e.g., the auto-driving system operators such as company A in the above scenario) and/or third-parties, various existing solutions have been proposed. For example, in one existing solution, homomorphic encryption is used such that the deep learning computations are directly executing on the encrypted data. Multi-party federate learning is used in another existing solution to protect raw data from other raw data. In yet another existing solution, the entire model is placed in a trusted execution environment (TEE) and trained therein. However, each of these existing solutions have their own drawbacks.

There are several third-party libraries that support full homomorphic encryption. Theoretically, with these libraries, sample data can be collected by local authorities and encrypted with a homomorphic encryption algorithm. The encrypted data can then be provided to the application operators for use in training, for example, a medical diagnosis AI model or an auto-driving AI model. After training, model parameters are sent to the local authorities to be decrypted with the encryption key and the decrypted parameters can be returned to the application operators. In this way, the model of the application operators can be trained with the local data without losing the confidentiality of the local data samples. However, this solution has several drawbacks. First, the overhead of homomorphic encryption is prohibitively heavy for practical uses. This is especially the case for a deep AI model with several TB (terabytes) of parameters wherein performance, due to the burdensome overhead, would be unacceptable. Further, to date, no homomorphic encryption library can support accelerators. Thus, graphic processing units (GPUs), field programmable gate arrays (FPGAs), or tensor processing units (TPUs) cannot be used to train an AI model in conjunction with homomorphically-encrypted data.

Multi-party federate learning frameworks have been proposed. However, these frameworks are mostly focused on how to exchange data between multiple parties without exposing raw data to each other and how to integrate features extracted from the data from each party into training models. Currently, such frameworks are very complex with many predefined restrictions on computing/networking infrastructure (to exchange and collaborate on data among multiple parties) and the deep learning model (to integrate the data from multiple parties into the deep learning model), and cannot be adapted for practical use.

Turning now to TEE-based solutions, details of existing frameworks will be explained prior to describing some drawbacks. Illustrative embodiments directed to TEE-based solutions for providing training data protection in an artificial intelligence model execution environment will then be described.

One existing cloud-based TEE framework called Secure Encrypted Virtualization (SEV) is available from Advanced Micro Devices (AMD) Inc. With SEV, an AMD on-chip secure processor (SP) manages a unique key for each virtual machine (VM) in the execution environment. The key is used to encrypt/decrypt memory contents between the central processing unit (CPU) and the main memory. The encrypting/decryption is done automatically by the SP with the key dedicated to the VM, so that the contents inside the private memory pages of a VM are unreadable and thus inaccessible to other VMs and even to the hypervisor. Furthermore, with the introduction of Secure Nested Paging (SNP) as part of SEV, the AMD framework provides a complete TEE with support to perform remote attestation, secret runtime provisioning/sealing, and migration.

FIG. 1 shows an SEV-SNP execution environment 100. More particularly, as shown, a VM 102 requests from a secure processor (SP) 104 an attestation report with a hash of a public key unique to VM 102. SP 104 generates the attestation report containing the hash of the public key unique to VM 102, cryptographically signs the attestation report with a versioned chip endorsement key (VCEK), and returns the attestation report to VM 102. VM 102 sends the attestation report and its public key to a remote party 106. The attestation report, signed by SP 104, enables remote party 106 to verify the identity/authenticity of VM 102. Once VM 102 is verified, remote party 106 can safely return protected information to VM 102.

One advantage of SEV-SNP is that implementation of the framework only impacts the system software (i.e., hypervisor and/or guest operating system (OS)) and is transparent to application developers. That is, customers simply deploy their applications onto the SEV-SNP platform, and the hardware cooperates with the system software to provide security for the entire VM.

Another existing TEE-based solution provides a mobile-based TEE framework called TrustZone, which is available from ARM Limited. TrustZone adopts a different design from the SEV-SNP design. TrustZone operates based on splitting hardware into two isolated regions (called "secure world" and "normal world") with the CPU working in these two regions in two different modes with an extra non-secure (NS) bit added to a bus address, similar to an Asymmetric Multiprocessing Processing (AMP) system.

Figure 2:
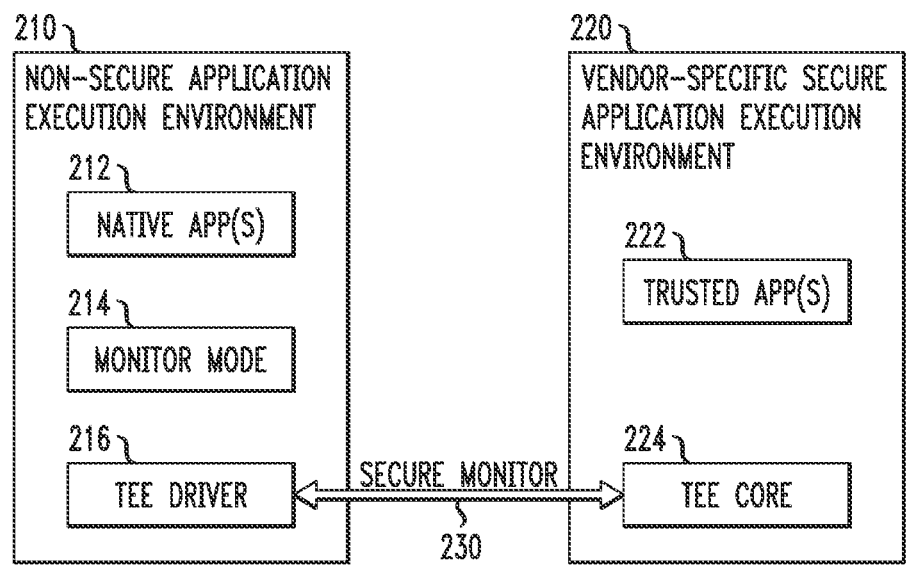
FIG. 2 illustrates another partitioned execution environment with which one or more illustrative embodiments can be implemented.

FIG. 2 shows an ARM TrustZone execution environment 200. More particularly, as shown, the two regions are illustrated as a non-secure application execution environment (normal world) 210 wherein one or more native applications 212 execute and a vendor-specific secure application execution environment (secure world) 220 wherein one or more trusted applications 222 execute. However, in the TrustZone implementation, the framework cannot directly communicate between the two execution environments 210 and 220. Instead, the CPU must enter a monitor mode 214 in the non-secure application execution environment 210 first and then switch to the secure world through a TEE driver 216 in non-secure application execution environment 210 connected via a secure monitor 230 with a TEE core 224 in vendor-specific secure application execution environment 220.

So in TrustZone, there is a lack of direct communication between the two execution environments 210 and 220. Thus, it is realized that in order to operate together with the TrustZone framework, the system software becomes very complicated. Also, the trusted operating system running inside the secure world (execution environment 220) is customized by different vendors with different implementations and different application programming interfaces (APIs) and may be very different from the operating system running in the non-secure application execution environment 210. To develop applications to execute on the TrustZone framework, the developer must choose one of the trusted vendor-specific OS implementations (e.g., Linaro OP-TEE or Google Trusty TEE) and then use the APIs provided by this trusted OS to develop their security applications.

Furthermore in terms of sensitive information, in the TrustZone framework, the developer needs to identify the sensitive information and place the sensitive information into the secure execution environment, then program these two different parts in different hardware partitions in the same physical machine, using different APIs provided by different operating systems (i.e., untrusted OS and trusted OS). For example, the non-secure execution environment APIs may be defined by a variant of Linux OS and the secure execution environment by OP-TEE. These two execution environments communicate by message services implemented by the driver and CPU hardware mode control of the operating systems. Note that, in SEV-SNP, the developer need not identify the sensitive information of the application. The application is simply developed and placed into the memory-encrypted VM to let the hardware/system software handle the execution.

Recall, as mentioned above, AI models such as deep learning models have become prevalent in a wide variety of applications, and data sets used to train such models can comprise sensitive data which needs to be protected. As such, considering an existing SEV-SNP framework, a straightforward approach would seem to be to place the entire AI model into the VM and, with the memory being encrypted, the input will be protected from the outside world. While such a solution can be developed very easily, it is realized herein that there are several severe drawbacks. First, for example, the model cannot utilize accelerators such as GPUs, FPGAs, TPUs, etc., as SEV-SNP can only protect the input-output (TO) between the CPU and main memory, not the device IO memory. Thus, the input will be exposed to the outside world if an accelerator is used. Second, placing all operators inside the encrypted VM will result in a performance penalty. Although the encryption/decryption in SEV-SNP is assisted by the SP hardware, it will still be suboptimal, compared to the solutions without such operations. Third, a secure computation environment is more expensive than the normal VMs, especially in a Function-as-a-Service (FaaS) environment where charging is based on how many resources are used and how long these resources are used. Placing the entire AI model into a secure VM will inevitably result in a higher cost.

In an existing TrustZone framework, placing an entire AI model in the framework is infeasible, as CPUs supporting TrustZone are focused on mobile/embedding applications with very limited and scarce computing resources to accommodate the entire model. Also, the trusted OS cannot support all operators defined by the deep learning model as such a trusted OS is normally defined for the cryptographic computations and message services.

Illustrative embodiments overcome the above and other drawbacks by providing solutions that protect data samples from direct access in the context of a trusted execution environment-based platform. Such solutions have many advantages, as will be explained, and can be easily integrated into deep learning frameworks to utilize accelerators (GPU, TPU, etc.) and protect customer privacy and their sensitive data.

Figure 3:
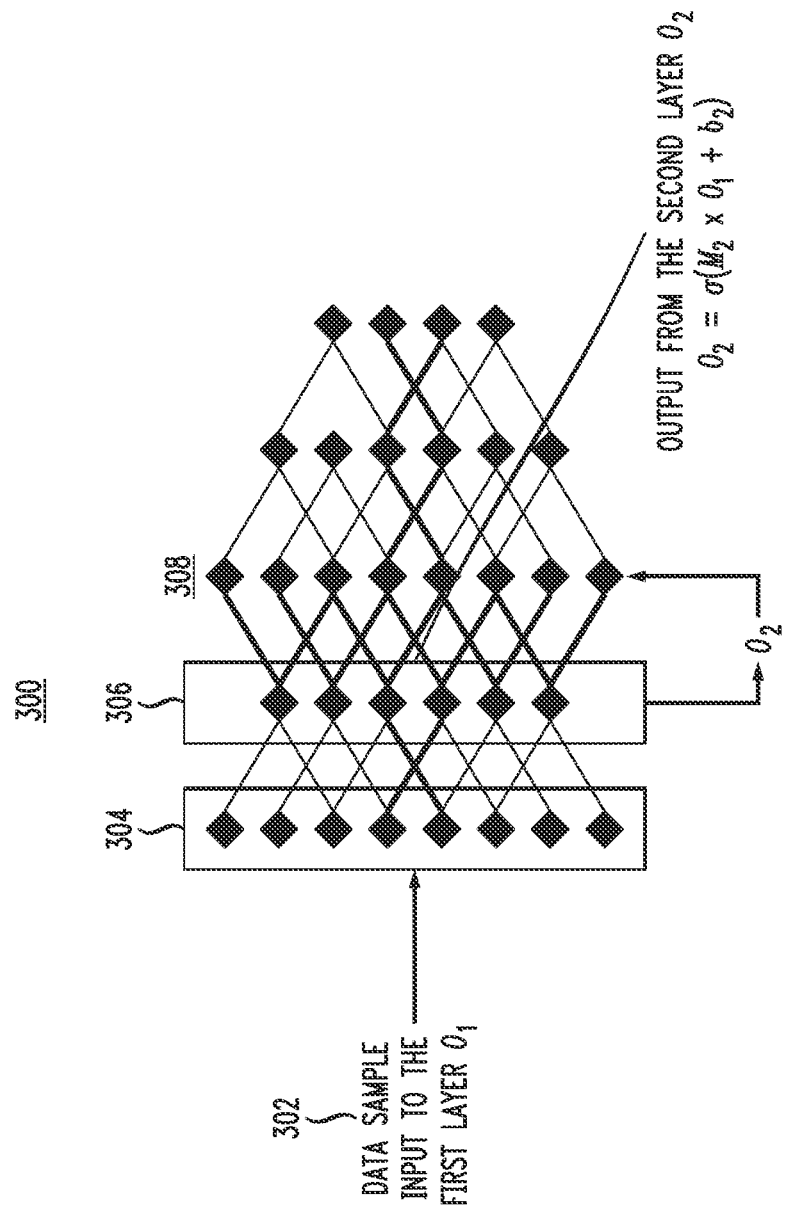
FIG. 3 illustrates an artificial full connection neural network associated with an artificial intelligence model with which one or more illustrative embodiments can be implemented.

More particularly, illustrative embodiments realize that, to protect input data samples, it is not necessary to protect the entire AI model. For example, consider FIG. 3 which illustrates an AI model in the form of an artificial full connection neural network 300. Assume a goal is to protect data sample 302, which serves as the input to the first layer 304 of the network which outputs $O_1$. Note that $O_1$ is used only in the computation inside second layer 306 whose output is defined as $O_2=\sigma(M_2 \times O_1\ b_2)$ wherein $M_2$ and $b_2$ are the model parameters of the second layer 306. The third layer 308 (and layers thereafter) can only see the second layer output $O_2$, and have no knowledge of the first layer output $O_1$, the data samples 302 input to first layer 304.

From the observations above, it is realized that if $O_1$ is unknown to the outside world and if both $M_2$ and $b_2$ are also unknown to the outside world, then it can be concluded that, just from $O_2$, the outside world cannot deduce the values of $O_1$. This is at least because in equation $O_2=\sigma(M_2 \times O_1+b_2)$, there are three unknown variables: $O_1$, $M_2$, and $b_2$, and they are unknowns with high-dimension tensors or vectors.

Accordingly, illustrative embodiments provide for executing a portion (i.e., a first sub-model) of the AI model in a secure execution environment (i.e., in the secure part of the TEE platform) and another portion and/or remainder (i.e., a second sub-model) of the AI model outside the secure execution environment (i.e., in the non-secure part of the TEE platform) to protect the one or more data samples used to train the AI model.

Figure 4:
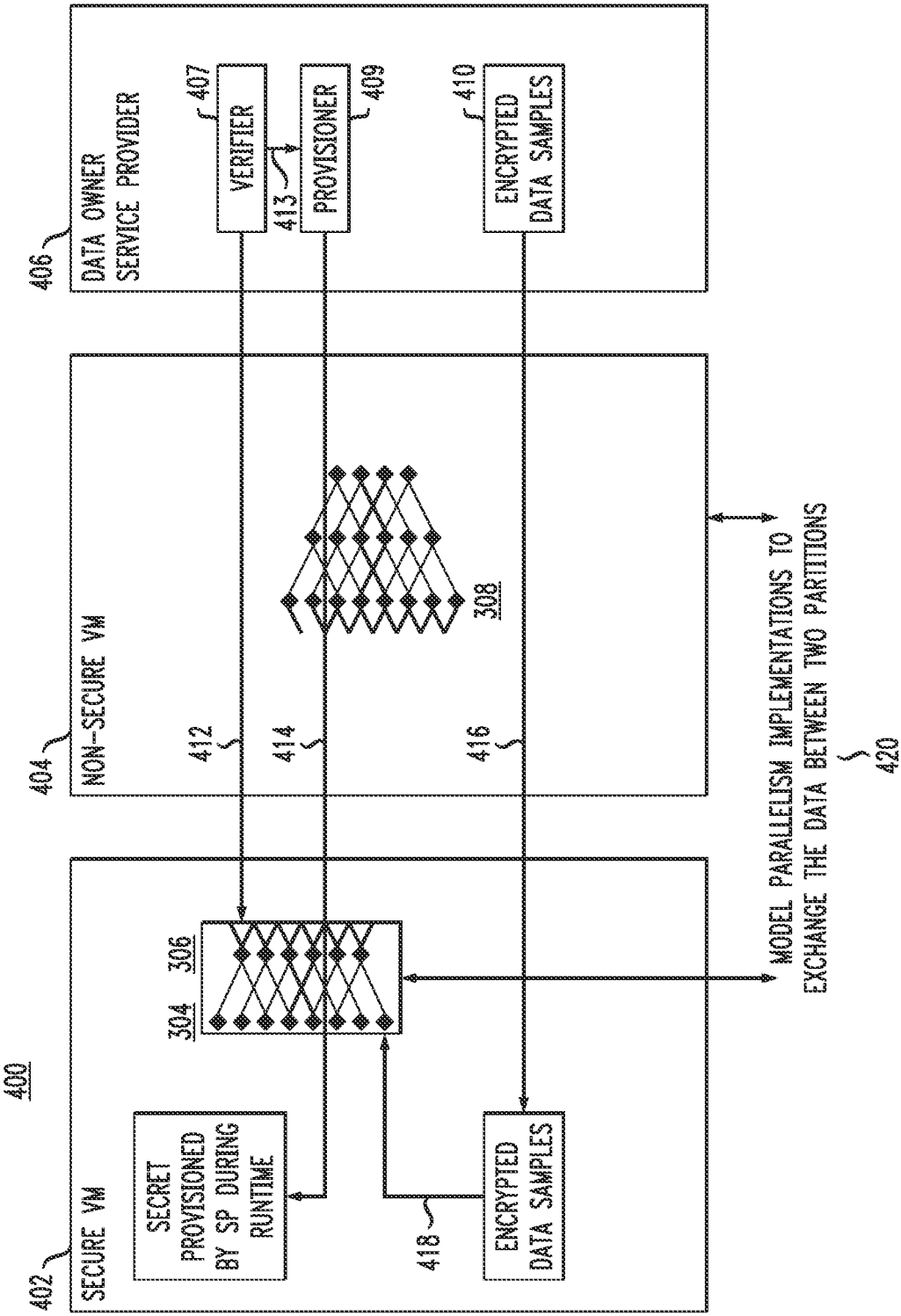
FIG. 4 illustrates a partitioned execution environment workflow for protecting input data samples of an artificial intelligence model according to an illustrative embodiment.

This is illustrated in execution environment workflow 400 of FIG. 4 wherein the two sub-models are shown respectively placed in two partitions, i.e., the first sub-model in an SEV-SNP (secure) VM 402 and the second sub-model in a normal (non-secure) VM 404, according to an illustrative embodiment. While the illustrative FIG. 4 description refers to an SEV-SNP framework as an example to discuss training data protection solutions according to illustrative embodiments, it is to be appreciated that the same or similar principles apply to TrustZone implementations.

More particularly, as shown in step 410, (one or more) data samples are collected and encrypted by a data owner service provider 406 (e.g., a local authority in the auto-driving system scenario described above). The key used to encrypt the data samples is known only to data owner service provider 406.

A verifier module 407 of data owner service provider 406 sends an attestation challenge to secure VM 402 in step 412. After successful attestation, in step 413, verifier module 407 forwards a local key created during the attestation process to a provisioner module 409 located in data owner service provider 406. In response, provisioner module 409 provisions one or more secrets to secure VM 402 in step 414 via a secure connection established in the attestation phase. Such secrets (i.e., a decryption key) are used to decrypt the encrypted data samples, i.e., encrypted in step 410 using an encryption key corresponding to the provisioned decryption key.

Data owner service provider 406 transmits the encrypted data samples to secure VM 402 in step 416. The encrypted data samples are then decrypted in secure VM 402 and, as clear-text, are input to the partition (i.e., first sub-model) inside secure VM 402 in step 418. Because the entire memory inside secure VM 402 is encrypted by the SP, the output $O_1$ of first layer 304 (FIG. 3) is unknown outside secure VM 402. The model parameters $M_2$ and $b_2$ of the second layer 306 (FIG. 3) are also unknown outside secure VM 402, because they are initialized with random numbers inside secure VM 402 and cannot be accessed from outside secure VM 402. Only the output $O_2$ of the second layer 306 is visible outside secure VM 402 and is passed from secure VM 402 as an input to third layer 308 (FIG. 3) in non-secure VM 404 via a model parallelism procedure. Model parallelism enables layers of a model that are distributed across multiple nodes or devices to efficiently communicate. The model parallelism procedure can be any existing model parallelism procedure, by way of example only, model parallelism described in U.S. Ser. No. 16/678,758 filed on Nov. 8, 2019, now U.S. Pat. No. 11,461,291, and entitled "Method, Electronic Device and Computer Program Product for Processing Machine Learning Model," the disclosure of which is incorporated by reference herein in its entirety, or another model parallelism procedure such as mesh-Tensor- Flow. Accordingly, illustrative embodiments protect the data samples from direct access from application operators.

For some cases, if the second layer 306 parameters $M_2$ and $b_2$ are initialized from the parameters of the previous model in a sequential model, without being initialized with random numbers, the parameters $M_2$ and $b_2$ will be visible outside the secure VM and then data sample $O_1$ cannot be protected. In such cases, illustrative embodiments find the first layer where its parameters are not initialized with predefined values and place this layer and all its previous layers into the secure VM, and from the output of this layer, the data sample cannot be deduced. It is possible to always identify such a layer as only a limited number of layers in a model are initialized with pre-defined values from other models.

Referring back to the use case mentioned above, recall that a company based in country A develops an auto-driving system which is to be operated in county B and trained using local roadmap data of country B, but that country B restricts collection and/or access of local roadmap data outside country B. Thus, company A finds a local company in country B to serve as an intermediary to collect the roadmap information. In accordance with illustrative embodiments, company A defines the deep learning model into two partitions, i.e., a secure partition and a non-secure partition. Company A delivers the secure partition to local delegation company B for execution in secure VM 402, while having the non-secure partition execute in non-secure VM 404. The local company B collects the local roadmap information and encrypts it with the local key known only to itself. This encrypted dataset can be preloaded into the secure VM 402, as shown in step 416. Company B verifies that secure VM 402 and its installation process are the same as the version it evaluated (without being tampered with) by validating the software measure signed by the hardware certificate, as shown in step 412. Company B then establishes a secure channel to secure VM 402 with the key pairs created during the attestation phase to provision the decryption key to secure VM 402, as shown in step 414. Then, the secure part in secure VM 402 uses the key to decrypt the dataset, but the decrypted clear-text dataset is inaccessible outside secure VM 402, including being inaccessible by the untrusted part in the non-secure VM 404, as this clear-text is only for the local virtual CPU in the VM, not for the guest virtual memory or the host physical memory as it will be encrypted by the AMD SP (secure processor). After the model partition in secure VM 402 has finished processing the input, the output $O_2$ is sent from secure VM 402 to non-secure VM 404, driven by the model parallelism enabled framework, as shown in step 420. The computation of the remaining layers can be scheduled into the GPUs for execution.

It is to be appreciated that steps 412, 414 and 416 occur only once when the application is launched. The only overhead of this solution is step 420 for each batch during training. However, as $O_2$ (and its differentials in backpropagation) is only a relatively small-sized vector, this cost is reasonable.

Accordingly, as explained herein, illustrative embodiments provide effective and secure solutions to protect data samples by partitioning a subset of layers of an AI model (e.g., one or more initial layers at the beginning of the model) into a secure execution environment (e.g., SEV-SNP VM, a TrustZone vendor-specific secure execution environment) decrypting encrypted user data samples inside the secure execution environment with a cryptographic key provisioned during runtime.

Illustrative embodiments are effective for many reasons, by way of example only:

(i) Encryption/decryption only once: unlike homomorphic encryption which executes all computations on the encrypted data, illustrative embodiments need only encrypt/decrypt the user data once and all training computations are executed on the clear-text data.

(ii) Just a relatively small subset of layers of the model are placed in the secure execution environment: unlike a solution that would place the entire model inside a SEV-SNP VM, illustrative embodiments only need to compute a relatively small number of layers and therefore a relatively smaller SEV-SNP VM is sufficient. As only a few layers are encrypted/decrypted, operational performance of the execution environment is improved.

(iii) Illustrative embodiments can be integrated into current cloud/edge computing infrastructure: unlike federate learning, illustrative embodiments reuse current deep learning frameworks and cloud computing infrastructure without extra resources more than current industry solutions, and can be very easily implemented and deployed.

(iv) Leveraging accelerators: unlike existing solutions which cannot leverage accelerators, illustrative embodiments support accelerators. Although a minor partition of the model is inside the SEV-SNP VM and therefore cannot be accelerated, the major part of the model outside the SEV-SNP VM can still be executed on GPUs, TPUs and/or other accelerators.

(v) Although there is some overhead by exchanging $O_2$ between two partitions in two VMs, this overhead is acceptable and can be ignored since typically $O_2$ is a very small-sized vector and the latency of this transportation can be safely ignored.

Illustrative embodiments are secure for many reasons, by way of example only:

(i) Illustrative embodiments use SEV-SNP VM with full memory encryption to make sure the secure partition cannot be tampered with by other parties.

(ii) Illustrative embodiments enable the data owner to encrypt their data and only provision secrets to the attested parties.

(iii) The key/secret exchange is via a secured channel established during attestation.

Still further, although there are many ways to exchange data between the SEV-SNP VM and the outside untrusted world, illustrative embodiments employ a very effective and flexible way to use model parallelism supported by the deep learning framework to implement the data exchange transparently to the application operator and the data owner. It is to be appreciated that advantages described above and otherwise herein are achievable in execution environments other than the SEV-SNP environment (e.g., TrustZone and other TEE-based frameworks).

Figure 5:
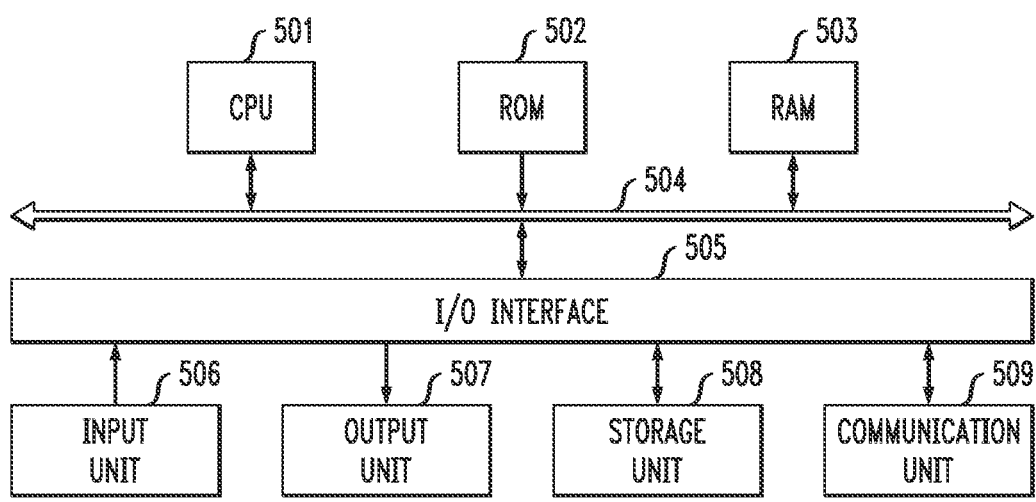
FIG. 5 illustrates a processing platform used to implement an information processing system with partitioned execution environment functionalities for protecting input data samples of an artificial intelligence model according to an illustrative embodiment.

FIG. 5 illustrates a block diagram of an example processing device or, more generally, an information processing system 500 that can be used to implement illustrative embodiments. For example, one or more components in FIGS. 1-4 can comprise a processing configuration such as that shown in FIG. 5 to perform steps described herein. Note that while the components of system 500 are shown in FIG. 5 as being singular components operatively coupled in a local manner, it is to be appreciated that in alternative embodiments each component shown (CPU, ROM, RAM, and so on) can be implemented in a distributed computing infrastructure where some or all components are remotely distributed from one another and executed on separate processing devices. In further alternative embodiments, system 500 can include multiple processing devices, each of which comprise the components shown in FIG. 5.

As shown, the system 500 includes a central processing unit (CPU) 501 which performs various appropriate acts and processing, based on a computer program instruction stored in a read-only memory (ROM) 502 or a computer program instruction loaded from a storage unit 508 to a random access memory (RAM) 503. The RAM 503 stores therein various programs and data required for operations of the system 500. The CPU 501, the ROM 502 and the RAM 503 are connected via a bus 504 with one another. An input/output (I/O) interface 505 is also connected to the bus 504. It is to be appreciated that component 501 in FIG. 5 can alternatively or additionally represent an accelerator such as, but not limited to, a TPU, a GPU, and combinations thereof.

The following components in the system 500 are connected to the I/O interface 505, comprising: an input unit 506 such as a keyboard, a mouse and the like; an output unit 507 including various kinds of displays and a loudspeaker, etc.; a storage unit 508 including a magnetic disk, an optical disk, and etc.; a communication unit 509 including a network card, a modem, and a wireless communication transceiver, etc. The communication unit 509 allows the system 500 to exchange information/data with other devices through a computer network such as the Internet and/or various kinds of telecommunications networks.

Various processes and processing described above may be executed by the CPU 501. For example, in some embodiments, methodologies described herein may be implemented as a computer software program that is tangibly included in a machine readable medium, e.g., the storage unit 508. In some embodiments, part or all of the computer programs may be loaded and/or mounted onto the system 500 via ROM 502 and/or communication unit 509. When the computer program is loaded to the RAM 503 and executed by the CPU 501, one or more steps of the methodologies as described above may be executed.

Illustrative embodiments may be a method, a device, a system, and/or a computer program product. The computer program product may include a computer readable storage medium having computer readable program instructions thereon for causing a processor to carry out aspects of illustrative embodiments.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals sent through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of illustrative embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Various technical aspects are described herein with reference to flowchart illustrations and/or block diagrams of methods, device (systems), and computer program products according to illustrative embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor unit of a general purpose computer, special purpose computer, or other programmable data processing device to produce a machine, such that the instructions, when executed via the processing unit of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing device, or other devices to cause a series of operational steps to be performed on the computer, other programmable devices or other devices to produce a computer implemented process, such that the instructions which are executed on the computer, other programmable devices, or other devices implement the functions/acts specified in the flowchart and/or block diagram block or blocks.

The flowchart and block diagrams illustrate architecture, functionality, and operation of possible implementations of systems, methods and computer program products according to various embodiments. In this regard, each block in the flowchart or block diagrams may represent a module, snippet, or portion of code, which includes one or more executable instructions for implementing the specified logical function(s). In some alternative implementations, the functions noted in the block may occur out of the order noted in the figures. For example, two blocks in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
executing a first partition of an artificial intelligence model within a secure execution area of an information processing system and a second partition of the artificial intelligence model within a non-secure execution area of the information processing system, wherein data at least one of obtained and processed in the first partition of the artificial intelligence model is inaccessible to the second partition of the artificial intelligence model, wherein the data obtained in the first partition comprises one or more data samples in an encrypted form usable to train the artificial intelligence model wherein the first partition of the artificial intelligence model comprises one or more parameters that are randomly initialized such that the one or more parameters are inaccessible to the second partition of the artificial intelligence model, a first output which is based in part on the one or more randomly initialized parameters of the secure execution area and inaccessible to the second partition of the artificial intelligence model, and a second output which is based in part on the one or more randomly initialized parameters of the secure execution area and accessible to the second partition of the artificial intelligence model, wherein the second output of the first partition is accessible to the second partition of the artificial intelligence model via a model parallelism-based procedure;
wherein the data is associated with information collected and accessed by a first entity based on a first geographic area which cannot be collected and accessed by a second entity of a second geographic area different from the first geographic area;
wherein the second entity of the second geographic area has access to the second output via the model parallelism-based procedure;
wherein the one or more data samples are decrypted in the secure execution area following an attestation process, comprising:
receiving an attestation challenge from the first entity at the secure execution area; and
in response to a successful attestation, receiving one or more decryption keys from the first entity at the secure execution area via a secure connection created during the attestation process to decrypt the one or more data samples in the encrypted form; and
wherein the information processing system comprises at least one processor and at least one memory storing computer program instructions wherein, when the at least one processor executes the computer program instructions, the information processing system performs the above step method.

2. The method of claim 1, further comprising obtaining at least one decryption key of the one or more decryption keys in the secure execution area, wherein the at least one decryption key is useable to convert the one or more data samples into a decrypted form within the secure execution area.

3. The method of claim 2, wherein the artificial intelligence model comprises a network, wherein the first partition of the artificial intelligence model comprises a first set of layers of the network and the second partition of the artificial intelligence model comprises a second set of layers of the network; and wherein the first set of layers comprises initial layers of the network and the second set of layers comprises remaining layers of the network.

4. The method of claim 3, further comprising:
processing the one or more data samples in the decrypted form in the first set of layers of the network within the secure execution area;
generating, based on the processing, a third output of the secure execution area; and
sending the third output to the non-secure execution area wherein, given another output, the one or more data samples in the decrypted form and one or more model parameters generated by the first set of layers of the network are inaccessible to the non-secure execution area.

5. The method of claim 1, wherein the secure execution area comprises a secure virtual machine and the non-secure execution area comprises a non-secure virtual machine.

6. The method of claim 1, wherein the one or more data samples are used as input to a first layer of the first partition and the first output is generated in a second layer of the first partition and further based in part on the one or more data samples.

7. The method of claim 5, wherein the secure virtual machine comprises a Secure Encrypted Virtualization (SEV) with Secure Nested Paging (SNP).

8. A system, comprising:
a secure execution area of an information processing system; and a non-secure execution area of the information processing system operatively coupled to the secure execution area,
wherein the secure execution area is configured to execute a first partition of an artificial intelligence model and the non-secure execution area is configured to execute a second partition of the artificial intelligence model, wherein data at least one of obtained and processed in the first partition of the artificial intelligence model is inaccessible to the second partition of the artificial intelligence model, wherein the data obtained in the first partition comprises one or more data samples in an encrypted form usable to train the artificial intelligence model;
wherein the first partition of the artificial intelligence model comprises one or more parameters that are randomly initialized such that the one or more parameters are inaccessible to the second partition of the artificial intelligence model, a first output which is based in part on the one or more randomly initialized parameters of the secure execution area and inaccessible to the second partition of the artificial intelligence model, and a second output which is based in part on the one or more randomly initialized parameters of the secure execution area and accessible to the second partition of the artificial intelligence model, wherein the second output of the first partition is accessible to the second partition of the artificial intelligence model via a model parallelism-based procedure;
wherein the data is associated with information collected and accessed by a first entity based on a first geographic area which cannot be collected and accessed by a second entity of a second geographic area different from the first geographic area;
wherein the second entity of the second geographic area has access to the second output via the model parallelism-based procedure;
wherein the one or more data samples are decrypted in the secure execution area following an attestation process, comprising:
receiving an attestation challenge from the first entity at the secure execution area; and
in response to a successful attestation, receiving one more decryption keys from the first entity at the secure execution area via a secure connection created during the attestation process to decrypt the one or more data samples in the encrypted form; and
wherein the system further comprises one or more processors and one or more memories storing computer program instructions.

9. The system of claim 8, wherein the secure execution area is further configured to obtain at least one decryption key of the one or more decryption keys, wherein the at least one decryption key is useable to convert the one or more data samples into a decrypted form within the secure execution area.

10. The system of claim 9, wherein the artificial intelligence model comprises a network, and wherein the first partition of the artificial intelligence model comprises a first set of layers of the network and the second partition of the artificial intelligence model comprises a second set of layers of the network.

11. The system of claim 10, wherein the first set of layers comprises initial layers of the network and the second set of layers comprises remaining layers of the network.

12. The system of claim 10, wherein the secure execution area is further configured to:

process the one or more data samples in the decrypted form in the first set of layers of the network;
generate a third output based on the processing; and
send the third output to the non-secure execution area wherein, given another output, the one or more data samples in the decrypted form and one or more model parameters generated by the first set of layers of the network are inaccessible to the non-secure execution area.

13. The system of claim 8, wherein the secure execution area comprises a secure virtual machine and the non-secure execution area comprises a non-secure virtual machine.

14. The system of claim 8, wherein the one or more data samples are used as input to a first layer of the first partition and the first output is generated in a second layer of the first partition and further based in part on the one or more data samples.

15. A non-transitory computer-readable medium comprising machine executable instructions, the machine executable instructions, when executed, causing a processing device to:
execute a first partition of an artificial intelligence model within a secure execution area of an information processing system and a second partition of the artificial intelligence model within a non-secure execution area of the information processing system, wherein data at least one of obtained and processed in the first partition of the artificial intelligence model is inaccessible to the second partition of the artificial intelligence model, wherein the data obtained in the first partition comprises one or more data samples in an encrypted form usable to train the artificial intelligence model;
wherein the first partition of the artificial intelligence model comprises one or more parameters that are randomly initialized such that the one or more parameters are inaccessible to the second partition of the artificial intelligence model, a first output which is based in part on the one or more randomly initialized parameters of the secure execution area and inaccessible to the second partition of the artificial intelligence model, and a second output which is based in part on the one or more randomly initialized parameters of the secure execution area and accessible to the second partition of the artificial intelligence model, wherein the second output of the first partition is accessible to the second partition of the artificial intelligence model via a model parallelism-based procedure;
wherein the data is associated with information collected and accessed by a first entity based on a first geographic area which cannot be collected and accessed by a second entity of a second geographic area different from the first geographic area;
wherein the second entity of the second geographic area has access to the second output via the model parallelism-based procedure; and
wherein the one or more data samples are decrypted in the secure execution area following an attestation process, comprising:
receiving an attestation challenge from the first entity at the secure execution area; and
in response to a successful attestation, receiving one more decryption keys from the first entity at the secure execution area via a secure connection created during the attestation process to decrypt the one or more data samples in the encrypted form.

16. The non-transitory computer-readable medium of claim 15, wherein the secure execution area is further configured to:

obtain at least one decryption key of the one or more decryption keys, wherein the at least one decryption key is useable to convert the one or more data samples into a decrypted form within the secure execution area.

17. The non-transitory computer-readable medium of claim 15, wherein the secure execution area comprises a secure virtual machine and the non-secure execution area comprises a non-secure virtual machine.

18. The non-transitory computer-readable medium of claim 16, wherein the artificial intelligence model comprises a network, wherein the first partition of the artificial intelligence model comprises a first set of layers of the network and the second partition of the artificial intelligence model comprises a second set of layers of the network; and wherein the first set of layers comprises initial layers of the network and the second set of layers comprises remaining layers of the network.

19. The non-transitory computer-readable medium of claim 15, wherein the one or more data samples are used as input to a first layer of the first partition and the first output is generated in a second layer of the first partition and further based in part on the one or more data samples.

20. The non-transitory computer-readable medium of claim 18, wherein the secure execution area is further configured to:
process the one or more data samples in the decrypted form in the first set of layers of the network;
generate a third output based on the processing; and
send the third output to the non-secure execution area wherein, given another output, the one or more data samples in the decrypted form and one or more model parameters generated by the first set of layers of the network are inaccessible to the non-secure execution area.

* * * * *